United States Patent [19]

Hanson

[11] 4,206,840

[45] Jun. 10, 1980

[54] MOVABLE BELT CONVEYOR ASSEMBLY

[76] Inventor: Raymond A. Hanson, c/o R. A. Hanson Company, Box 7400, Spokane, Wash. 99207

[21] Appl. No.: 879,067

[22] Filed: Feb. 21, 1978

Related U.S. Application Data

[63] Continuation-in-part of Ser. No. 708,902, Jul. 26, 1976, abandoned.

[51] Int. Cl.² ............ B65G 41/00; B65G 43/00
[52] U.S. Cl. ................. 198/301; 198/303; 198/304; 198/316; 198/864
[58] Field of Search .......... 198/301, 303, 304, 315, 198/316, 318, 507, 586, 587, 589, 810, 862, 864; 214/10; 180/6.48, 6.5, 14 R, 41, 77 D, 98, 134; 280/6.1, 6.11; 299/1, 18, 43–45, 56, 57, 64–67; 137/344; 239/177, 212; 414/133

[56] References Cited

U.S. PATENT DOCUMENTS

| | | | |
|---|---|---|---|
| 3,184,867 | 5/1965 | Symmank | 280/6.11 |
| 3,285,385 | 11/1966 | Langner | 198/301 |
| 3,342,417 | 9/1967 | Dowd | 239/212 |
| 3,621,978 | 11/1971 | Smith | 198/301 |
| 3,625,339 | 12/1971 | Smith | 198/301 |
| 3,807,436 | 4/1974 | Pringle | 137/344 |
| 3,979,062 | 9/1976 | Christensen et al. | 239/177 |
| 4,031,997 | 6/1977 | Nelson | 198/301 |

*Primary Examiner*—Joseph E. Valenza
*Attorney, Agent, or Firm*—Wells, St. John & Roberts

[57] ABSTRACT

A transversely movable belt conveyor assembly having an articulated frame supporting a single, endless conveyor belt for moving bulk particulate materials. The movable belt conveyor assembly is maintained perpendicular to a fixed reference, such as a receiving conveyor for the material contained thereon. The pivoted frames carrying the long endless belt are automatically maintained in a straight, end-to-end orientation relative to one another. The entire belt conveyor assembly is automatically maintained in a perpendicular relationship to the transverse fixed reference during movement of the assembly. Individual carriers for each segmented frame are independently driven and their relative speeds are controlled along the assembly to maintain the segmented frames in longitudinal alignment. The working flight is maintained laterally horizontal along its entire length to prevent spillage of material.

18 Claims, 18 Drawing Figures

MOVABLE BELT CONVEYOR ASSEMBLY

REFERENCE TO RELATED APPLICATION

This application is a continuation in part of U.S. patent application Ser. No. 708,902 on July 26, 1976, now abandoned.

BACKGROUND OF THE INVENTION

This disclosure relates to very long endless conveyor belt assemblies which are portable for movement in a direction transverse to their length. The belt assembly is designed for transporting loose, particulate material over long distances in conjunction with other handling equipment. As an example, the conveyor might be used in strip mining operations to remove the soil or overburden, or alternately to mine the desired one. The material might be placed on the conveyor by any type of material handling equipment, such as a dragline bucket, an upright blade or shear, a digging wheel, an auger, etc. The conveyor assembly is designed for use in removing surface material across a wide area with full capability for transverse movement of the conveyor to reposition it as the material is stripped away from the surface of the earth or is moved from large storage piles.

Movable conveyor systems have been used widely, although most move in a direction longitudinally along the length of the belt conveyor. Typical of conveyor systems that are intended to be very long conveyors that are transversely movable are the systems shown in the patent of Stephens, U.S. Pat. No. 2,331,813 and the patent to Becker, U.S. Pat. No. 2,266,673.

Many long conveyors, particularly movable and articulated conveyors, use a series of conveyors cascading from one to another rather than a single elongated belt. An illustration is shown in the Poundstone U.S. Pat. No. 3,003,613. However, the multiplicity of conveyors and motors required for such an apparatus greatly increases the statistical probability of mechanical failure in such a multiple system. The cost of building such a multiple mechanism is substantially greater than the costs encountered when using a single belt.

The use of a single belt is clearly desirable when conveying solid bulk materials over long, straight distances. A difficulty in moving the framework for a long single belt conveyor in a direction transverse to its length is encountered in maintaining the supporting framework for the conveyor in the straight-line configuration essential for proper support and for tracking of the belt. Another problem is torsional movement of the belt. Often terrain is not level along the entire length of the conveyor and the belt will develop a longitudinal twist. Material thus carried on the off-horizontal surface may spill over the side. The apparatus disclosed in this application was designed specifically to meet these problems by the application of automatic steering and alignment controls, and by positively controlling the lateral horizontal orientation of the conveyor working surface relative to angular displacement of its mobile supports.

DESCRIPTION OF THE PREFERRED EMBODIMENT

This disclosure relates to a belt conveyor assembly designed to be transversely movable and having the very long length necessary for carrying solid bulk materials, such as soil, coal or ore. The belt conveyor assembly, generally designated by the numeral 10, may feed material to a receiving, stationary conveyor 11. Such a conveyor 11 need not be fixed in place but might be a portable or movable conveyor that is stationary or fixed relative to the described operation of the belt conveyor assembly 10.

As used herein, the end of the belt conveyor assembly 10 adjacent to the stationary conveyor 11 shall be referred to as the "inboard end" of the conveyor. It constitutes the discharge end of the conveyor which directs material from the belt conveyor assembly 10 onto the belt of the stationary conveyor 11 or receives material from assembly 10 when it is desired to use the assembly for "stockpiling". The opposite end of conveyor assembly 10 (shown to the right in FIGS. 2 and 3) shall be referred to as the "outboard end".

Figure 1:
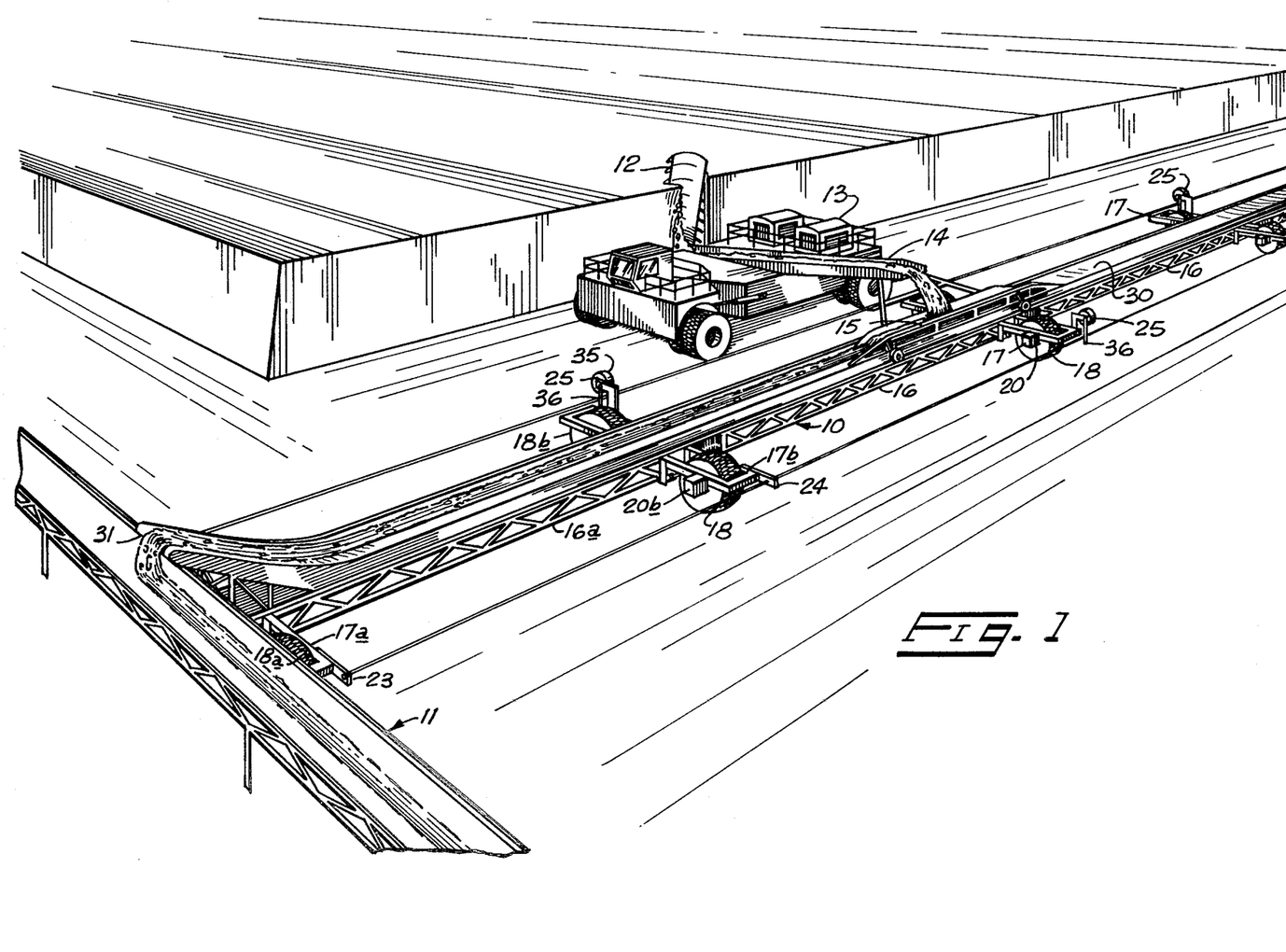
FIG. 1 is a perspective view showing a typical application of the invention.

The belt conveyor assembly 10 can be supplied with loose solid material from any source, including a hopper, conventional earth moving and digging equipment, dragline buckets, augers, digging wheels, vertical blades or shears, etc. For illustration purposes, FIG. 1 shows a typical working arrangement for strip mining at the surface, using a vertical shear blade 12 mounted to the mobile framework 13. As the framework 13 progresses, the blade 12 removes a layer of the overburden or ore, which falls onto a loading conveyor 14 that in turn discharges the material along the belt conveyor assembly 10.

The belt conveyor assembly 10 basically comprises an endless powered belt 30 of conventional design. It is stretched between end rollers 31-32 at the respective inboard and outboard ends of the assembly 10. The end rollers can be provided with tensioning devices to assure proper tension along the length of belt 30. Idler assemblies 33 are placed along the belt conveyor assembly 10 in the usual fashion to provide elevational support for the belt 30 between the end rollers 31, 32. Belt 30 may be powered by any suitable conventional power source (not shown).

A movable backboard 15 is illustrated in FIG. 1 as being mounted to a discharge end of loading conveyor 14. The backboard 15 is simply moved along the length of the belt 30 to assist in directing material properly onto the upper surface of the working flight of belt 30. Thus, the incoming material may be deposited onto belt 30 at any location along the length of the belt conveyor assembly 10.

Figure 12:
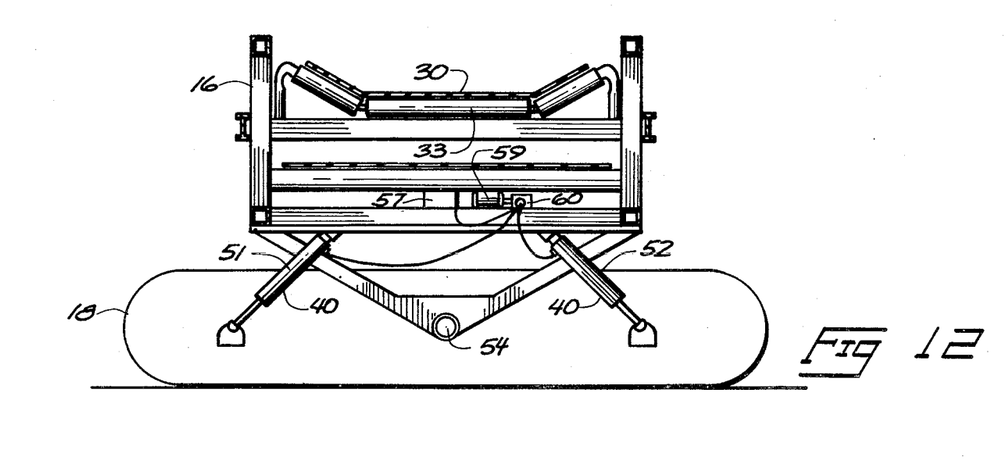
FIG. 12 is an enlarged sectional view taken along line 12—12 in FIG. 10.

The endless belt 30 is carried by a plurality of segmented frames 16, each of which comprises a rigid framework, illustrated in the form of a truss. The segmented frames 16 are carried by ground-supported carriages 17, each having ground-engaging wheels or tracks 18 (FIGS. 1 and 12). Power means, such as motors, are used to drive the individual wheels or tracks 18. More than one carriage 17 might be used to support any of the frames 16. However, the load to be imposed on the frame segments may be such that the assembly is best designed for maximum economy by use of a single carriage 17 under each segmented frame 16. In this situation (illustrated) each carriage will carry both a portion of its associated frame segment and part of the adjacent connected frame segment.

Figure 16:
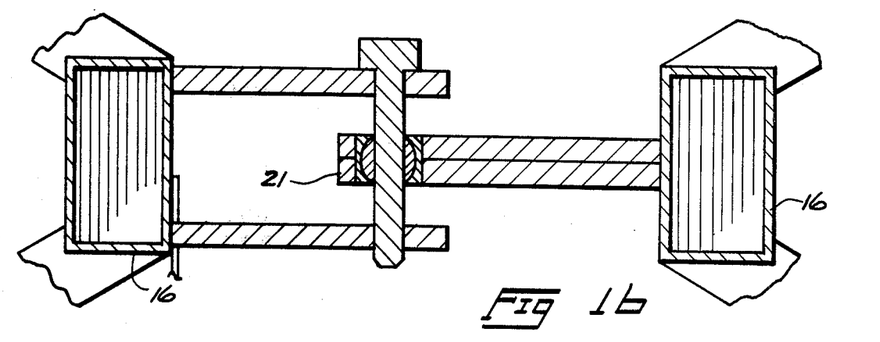
FIG. 16 is an enlarged sectional view taken along line 16—16 in FIG. 15.

The individual frames 16 are connected end-to-end to one another by pivot joint 21. The pivot joint 21 is shown in detail by FIG. 16 as a rotational ball type joint. With such a connection, adjacent frames 16 can articulate about the ball joints relative to one another in order to accommodate variations in the surface on which the carriages 17 are supported. Various other types of conventional universal joints, or lost motion connections, can be used to accommodate elevational movement between adjacent segmented frames 16.

The segmented frames 16 shown in FIGS. 1-9 are maintained in a straight line in longitudinal alignment with respect to one another by reference of taut lines 22, which are illustrated as being two string lines 22 at opposite sides of the assembly 10. Each string line 22 is stretched along the full length of the belt conveyor assembly 10, although a plurality of individual lines could be used at each pivot joint 21. The string lines 22 are shown anchored to end anchors 23 at the inboard and outboard ends of the assembly 10. Each string line is accurately located at positions longitudinally spaced from each pivot joint 21 by intermediate guide supports 24. The string lines 22 are engaged by sensing units 25 mounted to the segmented frames 16 adjacent each pivot joint 21.

Figure 2:
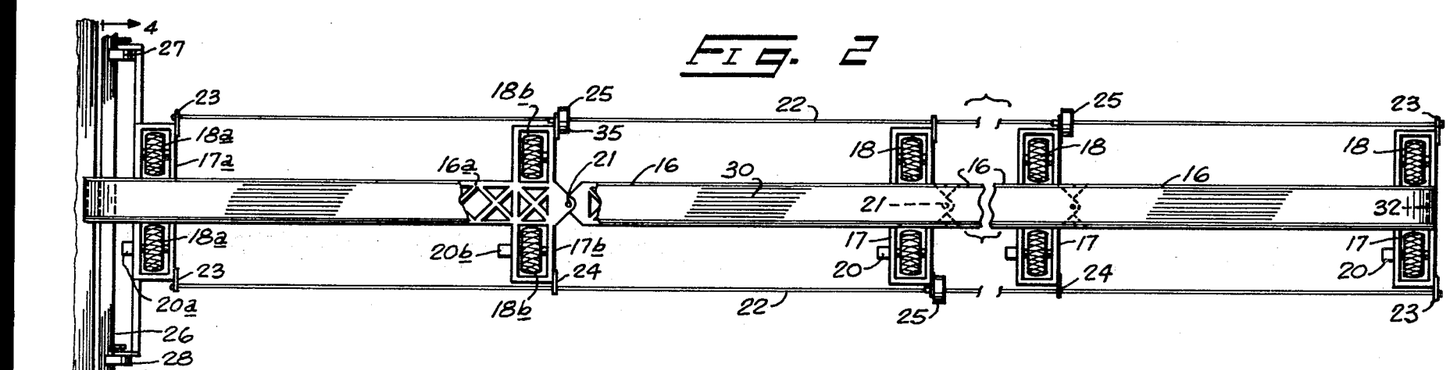
FIG. 2 is a plan view of the belt conveyor assembly, with the center portions broken away.
Figure 3:
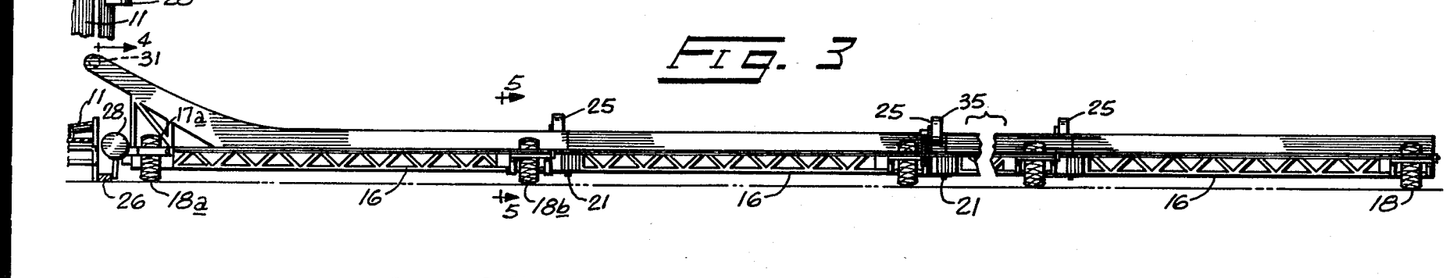
FIG. 3 is an elevational view of the assembly in FIG. 2.
Figure 4:
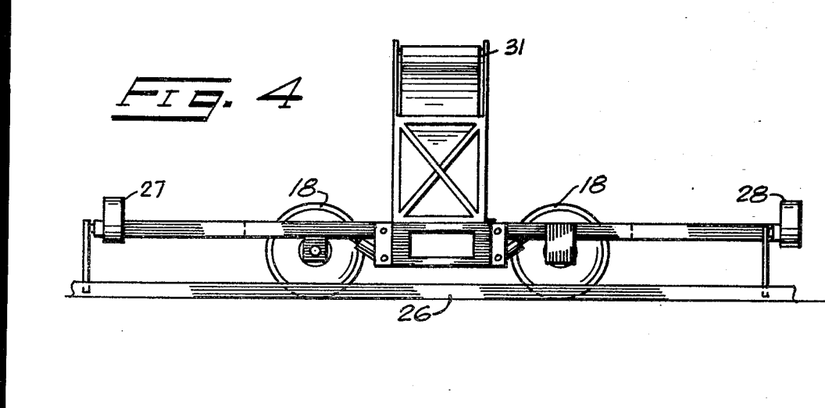
FIG. 4 is a sectional view taken along line 4—4 in FIG. 3.
Figure 5:
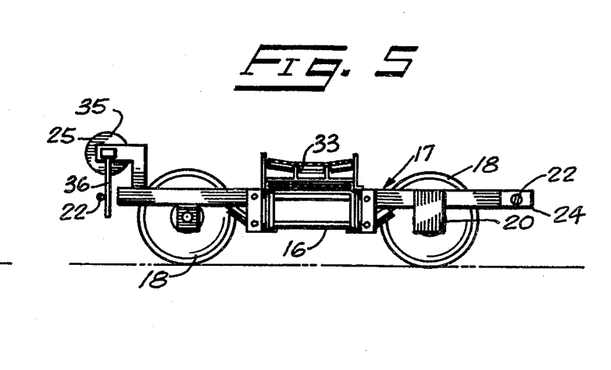
FIG. 5 is a sectional view taken along line 5—5 in FIG. 3.

As can be seen in FIG. 2, the two string lines 22 overlap one another along the full length of the conveyor assembly 10. The sensing units 25 at adjacent pivot joints 21 are projected to alternate sides of the endless belt 30 to engage the respective string lines 22. Depending upon the type of controls being used, a single string line could be substituted for the two string lines illustrated, but it may be desirable that the lines be stretched the maximum length possible so as to provide maximum sensitivity to the automatic alignment controls. This is achieved by stretching the string lines between every other pivot joint 21 and engaging them by sensing units 25 located at the intermediate pivot joint 21.

The sensing units 25 each comprise a housing 35 fixed to a bracket mounted on each frame 16, so that the housing 35 moves in unison with the frame 16. Depending downwardly from housing 35 is a sensing arm 36, pivoted to housing 35 about a horizonal, longitudinal axis parallel to the endless belt 30. Arm 36 is biased against one side of the engaged string line 22 so as to lightly rest against the string line 22 at all times. Relative movement between the string line 22 and the segmented frame 16 on which housing 35 is fixed can therefore be detected by pivotal movement of arm 36. The housing 35 may contain switches 37 (FIG. 17, 18) or valves, or other control devices which are rendered operational by slight movement of arm 36 relative to housing 35. This movement is utilized to control operation of the motors 20 and reposition the segmented frames 16 in an elongated, straight line at which the control assembly is preset.

Figure 15:
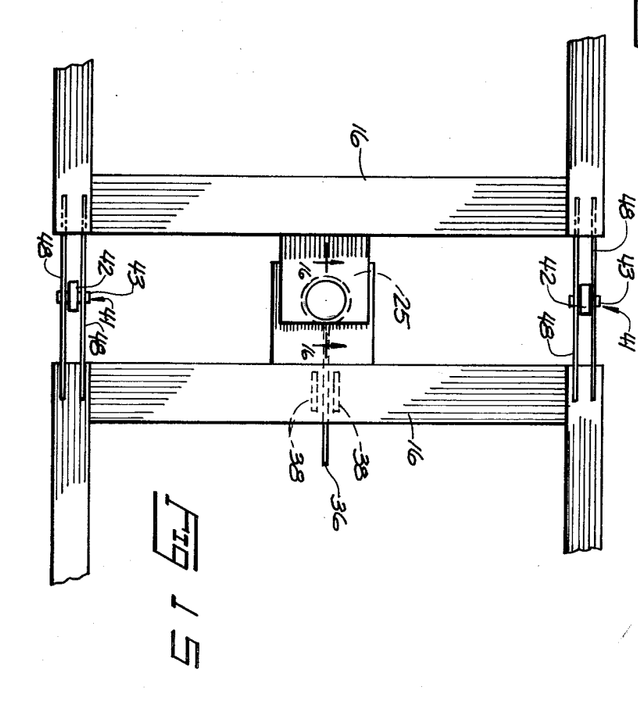
FIG. 15 is a plan view of the structure shown in FIG. 13 only showing the frame sections in proper alignment.

The particular frame arrangement shown in FIGS. 10-15 makes use of sensing apparatus by direct contact between adjacent frame segments. As shown in FIG. 15, a single sensor be fixed to one frame segment with its sensing arm 36 pivoted on an axis that is vertically aligned with the center of the joint 21. The arms 36 extend toward the adjacent frame segment. Laterally spaced abutments 38 are fixed to the adjacent frame segments in the pivotal path of the sensing arms 36. Therefore, when the adjacent frame segments come out of alignment, the appropriate sensors will be operated as an abutment engages and moves the associated sensor arm.

Figure 17:
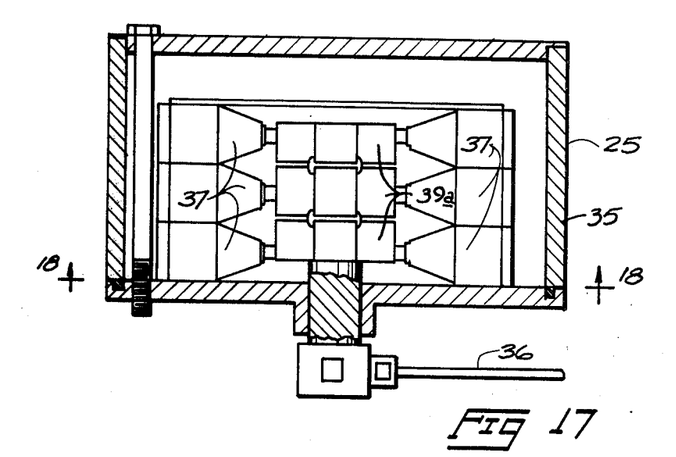
FIG. 17 is a sectional view of a misalignment sensing mechanism.
Figure 18:
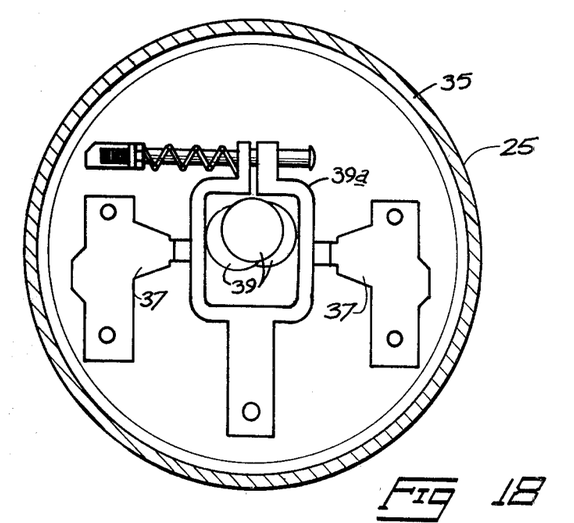
FIG. 18 is a sectional view taken along line 18—18 in FIG. 17.

With this arrangement, it becomes desirable to include switches 37 within the sensors for controlling movement of the segments in both forward and backward directions. FIGS. 17 and 18 show an arrangement with six switches 37. The three grouped on one side control forward movement and the remaining three control reverse movement. The switches are activated by progressive eccentric cams 39 and independently pivoted follower switch actuators 39a. The eccentric lobes of the cams are arranged such that slight movement of the interconnected sensing arm will move a first lobe into contact with an adjacent portion of the follower switch actuator. That actuator, moving in response to the first cam lobe, will actuate the switch adjacent to the actuator. This switch correspondingly activates a single motor 20 to slightly increase the speed in the direction the conveyor is moving. If misalignment is more severe, the cam will pivot further and thereby actuate a second switch. This tells the associated motor to operate yet faster in order that the trailing segment may catch up. Finally, if misalignment for some reason becomes even more severe, the cam will function to actuate a third switch to completely shut down the forward or rearward progress of the complete assembly before any damage occurs. The same process happens when a segment gets too far ahead of the remaining string, except that the reverse switches are operated to cause the associated motors to reverse and move the connected segments backwardly until alignment occurs.

Further details of suitable sensing devices are described in U.S. Pat. Nos. 3,511,949 and 3,247,771, both of which are hereby incorporated into this disclosure by reference.

The inboard end frame 16a has two ground-supported carriages 17 mounted to it, the inboard carriage at the inner end of frame 16a being designated by the reference 17a in the drawings. The carriage 17a is provided with ground-engaging tracks or wheels 18a independently driven by motor unit 20a.

The outboard end frame 16b is supported at its outer end by a ground-supported carriage 17b having tracks or wheels 18b and powered by motor unit 20b.

The ground-supporting carriages 17a and 17b are controlled independently from the alignment controls that operate the tracks or wheels 18 on the intermediate carriages 17 adjacent each pivot point 21. The motor units 20a and 20b are simultaneously preset by manual or automatic drive controls to operate in a forward or reverse direction transverse to the length of the belt 30. The motor units 20a, 20b are activated in unison, but are independently controlled by steering controls along a transverse reference.

The transverse reference can be a stationary string line or other stationary surface aligned parallel to the intended direction of movement of the belt conveyor assembly 10. However, since the assembly 10 is normally used in conjunction with a perpendicular receiving conveyor 11, the transverse reference is preferably a transverse surface along the frame of the stationary conveyor 11. An example of such a reference surface is indicated in the drawings as 26.

The surface 26 is engaged by front and rear sensing units 27, 28 mounted to the inboard end of the end frame 16a. The sensing units 27,28 are similar to the units 25 described above and engage the surface 26 so as to detect any relative longitudinal movement between surface 26 and the inboard end of frame 16a at the position of the respective sensing unit 27 or 28. Since the steering units 27, 28 are transversely spread from one another, the two in conjunction with one another serve as detectors of angular movement of the frame 16a from its normal condition perpendicular to the surface 26.

In general, the automatic controls for the ground-supported carriages 17, 17a and 17b comprise three elements: (1) a preset manual or automatic control that drives the carriages 17a and 17b in unison in a forward or reverse direction; (2) alignment controls monitored by sensing units 25 and string lines 22, which maintain the segmented frames 16 in a longitudinally straight condition; and (3) steering controls monitored by sensing units 27, 28 in conjunction with surface 26 to override the preset operation of ground supported carriages 17a, 17b and maintain a perpendicular orientation of the segmented frames 16 with respect to the reference at 26. These controls can be understood by reference to the schematic illustrations in FIGS. 6 through 9.

Figure 6:
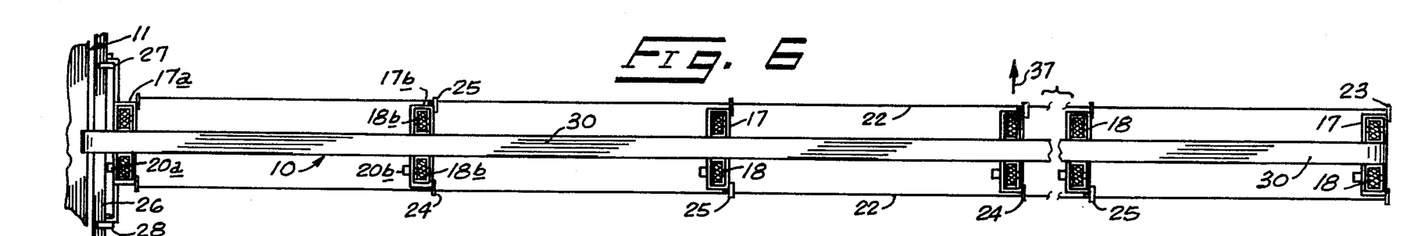
FIG. 6 is a schematic plan view showing normal operation of the conveyor assembly during movement.

FIG. 6 schematically shows the belt conveyor assembly 10 in its normal condition during movement in the direction indicated by arrow 37 which will be arbitrarily referred to as the "forward" direction. When the motors 20a, 20b are actuated to move the end carriages 17a, 17b in the forward direction, these carriages will momentarily lead the intermediate segmented frames 16. However, the relative movement between the pivoted frames will be immediately detected by the responsive sensing units 25 along the string lines 22, which in turn will operate the motors 20 on the intermediate ground-supported carriages 17 to constantly maintain the frames 16 in a straight-line condition. The end carriages 17a and 17b will continue to operate in unison so long as no angular deviation is detected by the sensing units 27, 28.

Figure 7:
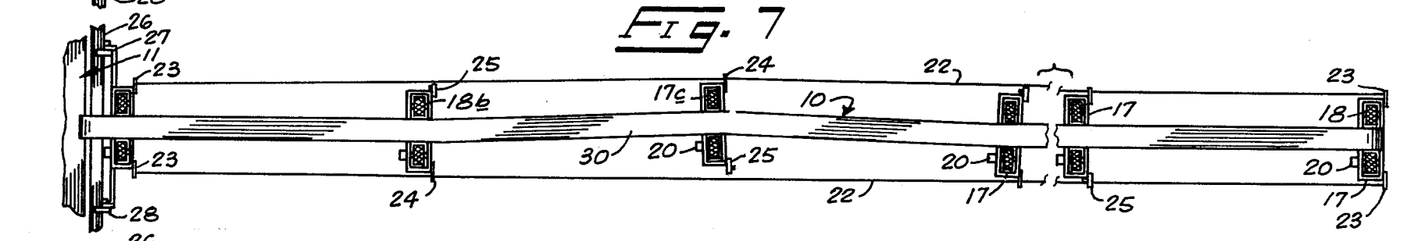
FIG. 7 is a schematic plan view showing one carriage temporarily out of alignment.

FIG. 7 illustrates an exaggeration in which a single ground supported carriage 17c is located forward of the remaining carriages 17. Because the sensing units 25 are highly sensitive to relative movement between the frames and the string lines, this amount of deviation will not occur during normal functioning of the apparatus. However, this drawing illustrates the relative positions of the frame 16 when correction is needed. The sensing unit 25 that is located adjacent to the carriage 17c will detect the deviation from the straight line condition along segmented frames 16 and will operate as described above to control movement of the ground-supported carriage 17c until the remaining carriages 17 are again properly aligned.

Figure 8:
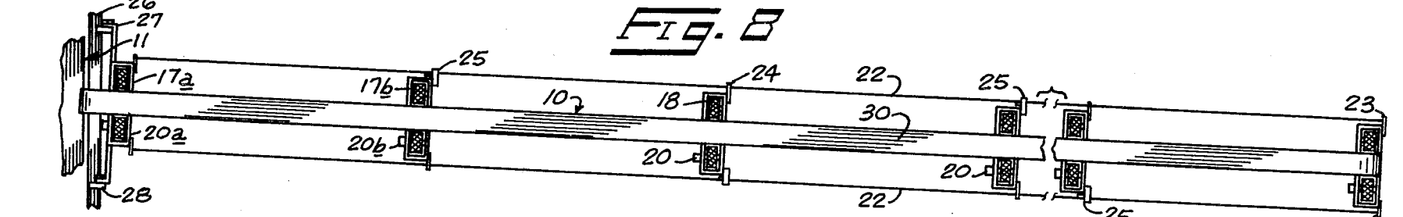
FIG. 8 is a schematic plan view showing the outboard carriage trailing the inboard carriage.
Figure 9:
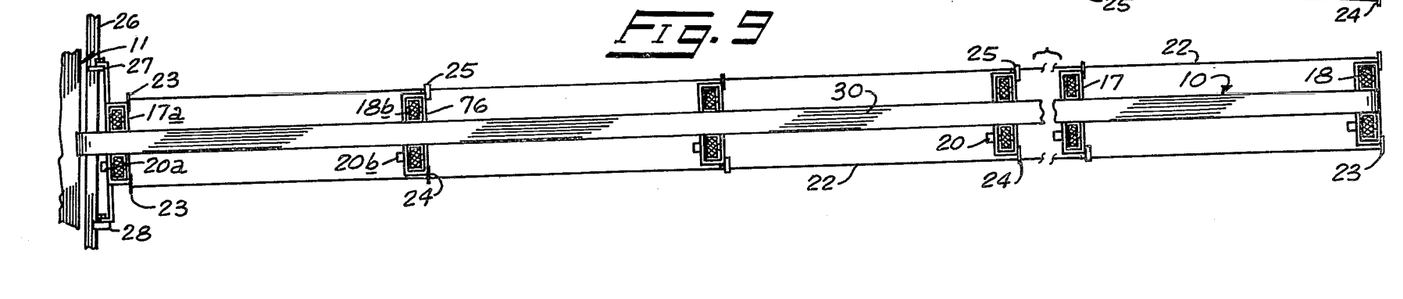
FIG. 9 is a schematic plan view showing the outboard carriage leading the inboard carriage.
Figure 10:
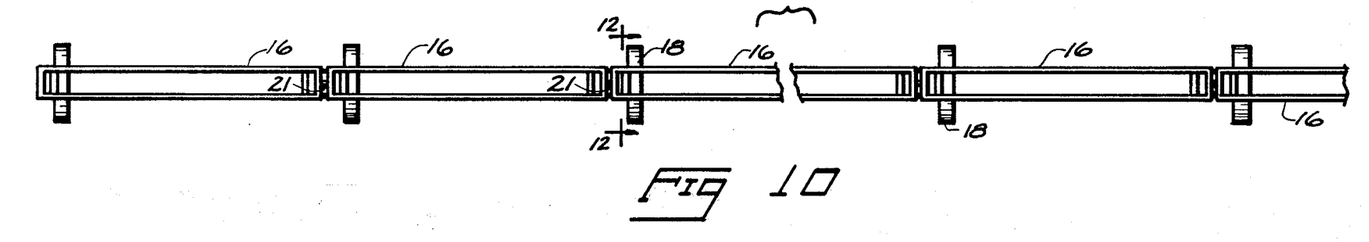
FIG. 10 is a diagrammatic plan view of the apparatus with a different form of frame structure.
Figure 11:
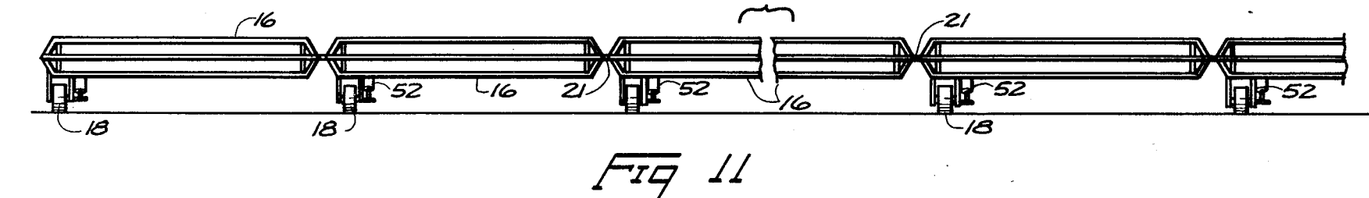
FIG. 11 is an elevational view of the structure shown in FIG. 10.

Again, during the normal operation, the segmented frames 16 will be maintained in the straight-line condition. The third set of switches provided in units 25, however, are incorporated along with sensing units 25 to shut down the operation of the apparatus or sound an alarm if the frames 16 perchance stray too far out of alignment and are uncorrected. However, it is possible that there will also be relative movement between the inboard and outboard carriages 17a, 17b which will result in the positions shown in an exaggerated manner in FIGS. 8 and 9. In FIG. 8 the outboard end carriage 17b trails the inboard carriage 17a. This will be detected by one of the sensing units 27, 28 which will override the manual control for the inboard carriage 17a to stop the carriage 17a until the carriage 17b has caught up with it and returned the aligned frames 16 to a condition perpendicular to the reference 26 as shown in FIG. 6. Similarly, if the outboard carriage 17b is leading the inboard carriage 17a, as shown in FIG. 9, one of the sensing units 27, 28 will stop the carriage 17b until the carriage 17a has caught up to it. During this correction, the alignment controls along string lines 22 will at all times maintain the frames 16 in a straight-line condition.

When it is desirable to turn the entire assembly for movement from one location to another, this can be accomplished by manually overriding the sensing units 27, 28, continuing to use the automatic alignment controls provided by the intermediate sensing units 25. The belt conveyor assembly can then be turned to any new position for subsequent operation along a reference surface or guide.

The above controls are described with respect to simple speed and on-off controls for the motors 20, 20a, and 20b. These motors can be any suitable power source for driving the carriages, such as electric motors, hydraulic motors, or combinations of such devices with suitable transmissions. The controls, in a very simple form, turn the motors on or off in order to effect movement, alignment, and steering. However, more sophisticated versions of such controls as shown in FIGS. 17 and 18 and described above will include speed variation controls to progressively increase its speed either in a forward or reverse direction in order to effect the directional movement required to maintain the assembly in proper longitudinal alignment.

It has been found that uneven terrain can cause difficulties in maintaining the working surfaces of the conveyor in a proper lateral horizontal plane. In other words, should one end of a segmented frame tilt laterally to one side while the adjacent end of the next segmented frame remains horizontal or tilts to the other side, the resulting misalignment of the frames would twist the belt, with the chance that material passing along the working surface might be discharged. Another possible cause of such twisting is uneven loading of the frame sections at any given point along the length of the conveyor. Undesired torsional stresses might develop on the frame segments and on the belt itself.

In recognition of the above problem, a cross leveling means is provided for maintaining the working surfaces of the belt and the frame segments in correct lateral horizontal orientation along the full belt length. This function may be accomplished by a controlled jack means 40 and an interconnecting linkage means 41.

The jack means 40 serves to maintain a lateral horizontal relationship of the several frame segments to their respective carriages.

The interconnecting linkage means 41 transmits the controlling force in maintaining this horizontal relationship produced by jack means 40 between adjacent frame segments. Thus, the entire length of interconnected frame segments may be maintained in a laterally horizontal attitude regardless of the angular orientation of the several supporting carriages.

Figures 13, 14:
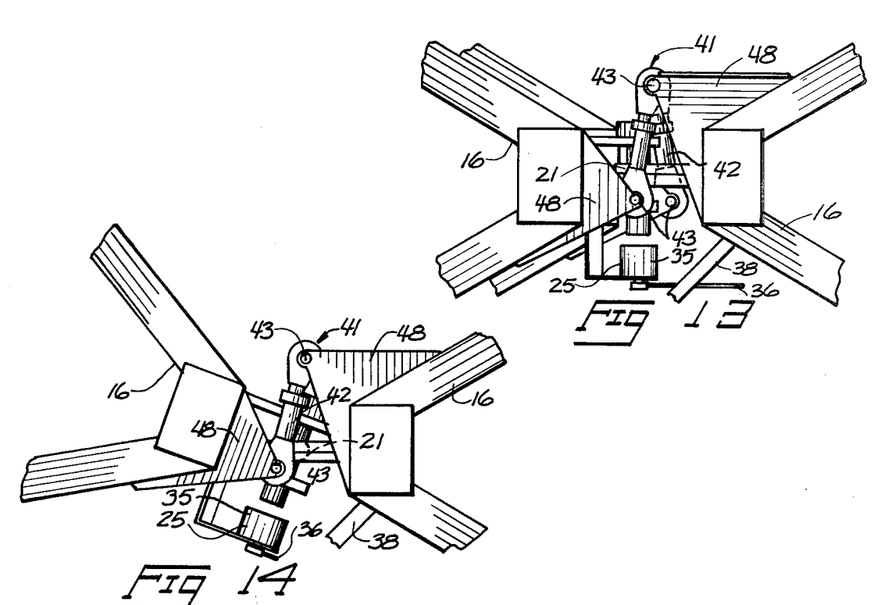
FIG. 13 is an enlarged, fragmentary elevational view of a typical connection between adjacent frame sections of my invention.
FIG. 14 is a view similar to FIG. 13 only showing a different position of the adjacent frame sections.

FIGS. 13 through 15 illustrate the torsional linkage means 41 in substantial detail. Means 41 includes pairs of upright link members 42 that are mounted between the adjacent ends of successive frame segments. The link members 42 are mounted at pivot points 43 to the frame segment ends with the pivot points 43 being in approximate vertical alignment. Pivots 43 are located by brackets 48 on opposite sides of the central ball pivot connection 21 and are equally spaced therefrom. Further, the pivots 43 define axes that are parallel to the working surface of the belt and are also parallel to one another and perpendicular to the length of the assembly. Through additional provision of jack means 40, these axes will also remain substantially horizontal at all times during operation.

The linkage means 41 is designed with the links in a substantial upright condition and yet freely pivotal about their respective axes. This enables limited pivotal movement of the connected frame segments as illustrated in FIGS. 13 and 14. However, the link members will not permit relative torsional movement of the segments about a longitudinal axis. Thus, if one of the associated frame segments is held in a lateral horizontal orientation, the forces maintaining that segment in the horizontal orientation will be transmitted through the link members 42 to the adjacent connected segment. Therefore, that segment would also be maintained in the horizontal orientation.

The problem overcome by the interconnecting linkage means 41 is substantial. At any time a conveyor of any substantial length is moved along a ground surface while operating, many torsional stresses are presented along the length of the supportive framework. This can result in frequent breakdowns and lengthy repairs. Therefore, the advantage presented in utilizing articulated frame segments along with the interconnecting linkage means 41 is important to help keep the frame segments in a lateral horizontal attitude and to enable independent relative movement between the segments to otherwise avoid damages. The interconnecting linkage means 41 serves to limit the angular offset of the individual frame segments as the assembly is moved along.

The controlled jack means 40 (FIG. 12) as briefly discussed above, is provided in conjunction with the interconnecting linkage means to maintain the working surfaces of the conveyor belt in lateral horizontal orientation. It basically connects the frame segments to their associated carriages 18 for the purpose of laterally pivoting the segments about individual pivot points 54 between each frame segment and carriage. The pivot points 54 define along the longitudinal pivot axis for the conveyor.

The jack means 40 may include cylinders 51 and 52. Cylinders 51, 52 extend in opposite angular directions from upper ends pivotally mounted to the frame segments to lower ends pivotally mounted at laterally spaced locations of the carriages. Lateral pivotal movement of the connected frame segment is achieved by extending one of the cylinders and retracting the other about the longitudinal axis of pivot 54. As described above, the interconnecting linkage means 41 will function to transmit this leveling force to the next adjacent frame segment.

The jack means includes a level sensing means 57. Sensing means 57 may be of the mercury level seeking form or may be a pendulum type commonly known in the industry. Details of a particular level sensing switch are found in U.S. Pat. No. 2,716,169, the relevant details of which are incorporated herein by reference.

A level sensing means 57 is mounted to each frame segment and each operates independently to detect horizontal misalignment of their respective frame segments. They are operatively connected to appropriate hydraulic pumps 59 and valves 60 to selectively control operation of the cylinders 51 and 52. For example, in reference to FIG. 12, if the assembly were moving in a direction to the right and connected a downward grade, the sensing unit would immediately recognize the situation and automatically operate the associated pump 59 and valve 60 to extend the cylinder 52 while simultaneously retracting cylinder 51. In doing this, the connected frame segment is pivoted about the axis of connection 54 to a normal level orientation. As the segment reaches a laterally horizontal orientation, the sensing means will deactuate the pump and valve to lock the cylinders until the terrain level again changes. During this time the link members 42 transmit the leveling forces produced by the cylinders to the end of the next adjacent segment. The adjacent segment includes its own supporting carriage at its remote end and also includes an independent level sensing means 57 to maintain that particular end at the lateral horizontal orientation. This enables the entire belt length and associated frame segments to be held in proper lateral horizontal orientation.

Various modifications of the details in the apparatus described above might be possible within the scope of the disclosure. Therefore, only the following claims are intended to define the invention.

What is claimed is:

1. A mobile belt conveyor assembly comprising:
   an endless powered belt arranged along a straight longitudinal path and including an upwardly facing flight for receiving particulate solid material along its length and a return flight, the flights being stretched between a first end roller assembly at an inboard end and a second end roller assembly at an outboard end;
   a plurality of frame segments movably supporting the belt and joined end-to-end about pivot connections arranged between said first and second end roller assemblies;

a plurality of ground-supported carriages mounted individually to the segmented frames, each supporting a segmented frame for pivotal movement thereon about a longitudinal axis;

individual power means mounted to each carriage for driving the carriage in a direction transverse to the belt;

sensing means mounted to the respective segmented frames, said sensing means being operatively connected to said individual power means for detecting variations in the relative positions of the segmented frames and for controlling operation of the individual power means to maintain the segmented frames in a condition such that the path of the belt along the segmented frames remains straight during movement of the conveyor assembly in a direction transverse to the belt; and cross leveling means interconnecting the carriages and frame segments for maintaining the upwardly facing flight in a laterally horizontal orientation.

2. A belt conveyor as set out in claim 1 wherein;

said first end roller assembly is mounted to the outer end of a first segmented frame having a ground-supporting carriage at its outer end; and said second end roller assembly is mounted to the outer end of the second segmented frame having a ground-supported carriage at its outer end;

and further comprising steering control means on said first frame segment for detecting variations from a condition at which the belt conveyor assembly is at a predetermined angular position with respect to a transverse fixed reference and for operating the individual ground-supported carriages at the outer ends of the first and second segmented frames to maintain the segmented frames in such predetermined angular position.

3. A belt conveyor assembly as set out in claim 2 wherein said steering control means operates the carriages at the outer end of the first and second segmented frames by varying the relative speeds of the individual power means mounted to their respective ground-supported carriages.

4. A belt conveyor assembly as set out in claim 1 wherein each segmented frame is a rigid structure having one ground-supported carriage supporting it adjacent it's pivot connection to an adjacent segmented frame;

said first end roller assembly being mounted to an inner end of a first segmented frame;

a ground-supported carriage at an outer end of the first segmented frame;

said second end roller assembly being mounted to the outer end of a second segmented frame having a ground-supported carriage at its outer end;

each groud-supported carriage having movable ground-engaging means thereon aligned perpendicularly to the longitudinal path of the belt and selectively driven by the individual power means for moving the carriage in a direction transverse to the path of the belt;

and further comprising steering control means for operating the individual ground-supported carriages at the outer ends of the first and second segmented frames to maintain the segmented frames in a desired path of movement.

5. A belt conveyor assembly as set out in claim 1 wherein each segmented frame is a rigid structure having one ground-supported carriage pivotably connected thereto adjacent its pivot connection to an adjacent frame segment;

each ground-supported carriage having movable ground-engaging means thereon aligned perpendicularly to the longitudinal path of the belt and selectively driven by the individual power means for moving the ground-engaging carriage in a direction transverse to the path of the belt.

6. A belt conveyor assembly as set out in claim 2 wherein the transverse fixed reference comprises a stationary surface;

and wherein said steering control means comprises two sensing units mounted to said first segmented frame in engagement with said stationary transverse surface for detecting deviations of said first segmented frame from a condition perpendicular to said stationary transverse surface and controlling operation of the ground-supported carriages at the outer ends of the first and second segmented frames to reposition said segmented frames to a condition peripendicular to the stationary transverse surface.

7. A belt conveyor assembly as set out in claim 1 wherein the cross leveling means includes an interconnecting linkage means between the frame segments for preventing lateral torsional movement of the frame segments relative to one another along the length of the assembly about the longitudinal axis.

8. The assembly as set out in claim 7 wherein the interconnecting linkage means is comprised of at least one link member for each pivot connection between adjacent frame segments, said link members interconnecting adjacent ends of pivotably connected frame segments and each link member including an upper end pivotalbly mounted to one frame segment and a lower end pivotably mounted to the adjacent frame segment.

9. The assembly as set out by claim 7 wherein the interconnecting linkage means is comprised of a pair of link members for each pivot connection, said link members interconnecting adjacent ends of the pivotably connected frame segments and each link member having an upper end pivotably mounted to one frame segment and a lower end pivotably mounted to the adjacent frame segment and wherein the link members are located on opposite lateral sides of the pivot connections.

10. The assembly as set out by claim 9 wherein the link members of each pair are of equal length and are equally spaced laterally from the respective point pivot connections between adjacent frame segments.

11. The assembly as set out by claim 1 wherein the cross leveling means includes at least one jack means mounted between each frame segment and its associated ground-supported carriage that is extensible to pivot the frame segment about the longitudinal axis relative to the ground-supporting carriage; and means operatively connected to the jack means for sensing the lateral relationship of the upwardly facing flight and the associated carriage, to correspondingly control the jack means to extend or retract to thereby maintain the upwardly facing flight in a lateral horizontal orientation.

12. The assembly as set out by claim 11 wherein the cross leveling means further comprises an interconnecting linkage means between the frame segments for preventing lateral torsional movement of the frame segments relative to one another along the length of the assembly about the longitudinal axis.

13. The assembly as set out by claim 12 wherein the interconnecting linkage means is comprised of at least one link member for each pivot connection between adjacent frame segments, said link members interconnecting adjacent ends of pivotably connected frame segments and each link member including an upper end pivotably mounted to one frame segment and a lower end pivotably mounted to the ajdacent frame segment.

14. The assembly as set out by claim 12 wherein the interconnecting linkage means is comprised of a pair of link members for each pivot connection, said link members interconnecting adjacent ends of the pivotably connected frame segments and each link member having an upper end pivotably mounted to one frame segment and a lower end pivotably mounted to the adjacent frame segment and wherein the link members are located on opposite sides of the pivot connections.

15. The assembly as set out by claim 14 wherein the link members of each pair are of equal length and are equally spaced laterally from the respective pivot connections between adjacent frame segments.

16. The assembly as set out by claim 1 wherein the sensing means comprises a sensor fixed to each successive frame segment having a sensing arm extending outwardly therefrom for contact with an adjacent connected frame segment, and wherein each frame segment includes abutments in the pivotal path of the sensing arm.

17. The assembly as set out by claim 16 wherein the sensing means further includes a plurality of switches operatively connected with the indivudal power means for each successive frame segment, said switches being selectively actuated by cams mounted for rotational movement in response to similar movement of the sensing arms, said cams being arranged such that the switches are progressively actuated in response to increasing deviation of the sensing arm from a normal, inoperative position.

18. A mobile belt conveyor assembly comprising:
an endless powered belt arranged along a straight longitudinal path and including an upwardly facing flight for receiving particulate solid material along its length and a return flight, the flights being stretched between first and second end roller assemblies;
a plurality of frame segments movably supporting the belt and jointed end-to-end about pivot connections arranged between said firt and second end roller assemblies;
a plurality of ground-supported carriages mounted individually to the respective segmented frames;
indivual power means mounted to each carriage for driving the carriage in a direction transverse to the belt;
sensing means mounted to the respective frame segments, said sensing means being operatively connected to said individual power means for detecting variations in the relative positions of the frame segments and for controlling operation of the individual power means to maintain the frame segments in a condition such that the path of the belt along the frame segments remains straight during movement of the conveyor assembly in a direction transverse to the belt; and
each of said sensing means including switches for controlling the speed and direction of movement of the individual power means responsive to variations in the relative lateral positions of the segmented frames;
each sensing means being fixed to an associated frame segment adjacent its pivot connection and including a plurality of switches operatively connected to the individual power means;
each sensing means further comprising:
a number of interconnected cams that are pivoted relative to the switches to progessively actuate the switches;
a sensing member mounted to the cams and extending toward the next adjacent frame segment for pivotal movement in response to contact with the frame segment; thereby causing responsive pivotal movement of the cams which, in turn, progressively engage and actuate the associated switches;
the frame segments and ground-supported carriages being pivotally connected to enable pivotal movement of the segments about a longitudinal axis;
at least one jack means between each frame segment and its associated ground-supporting carriage that is extensible to pivot the frame segment about the longitudinal axis relative to the ground-supported carriage; and
means operatively connected to the jack means for sensing the lateral relationship of the upwardly facing flight and a horizontal plane, and for controlling the jack means to extend or retract to thereby maintain the upwardly facing flight in a lateral horizontal orientation.

* * * * *